Feb. 1, 1927.                    H. S. OSBORNE                    1,615,913
                         RADIO DIRECTION FINDING SYSTEM
                         Filed Dec. 6, 1920        2 Sheets-Sheet 1

INVENTOR
H. S. Osborne
BY
ATTORNEY

Feb. 1, 1927. 1,615,913
H. S. OSBORNE
RADIO DIRECTION FINDING SYSTEM
Filed Dec. 6, 1920 2 Sheets-Sheet 2

INVENTOR
H. S. Osborne
BY
ATTORNEY

Patented Feb. 1, 1927.

1,615,913

UNITED STATES PATENT OFFICE.

HAROLD S. OSBORNE, OF MONTCLAIR, NEW JERSEY, ASSIGNOR TO AMERICAN TELEPHONE AND TELEGRAPH COMPANY, A CORPORATION OF NEW YORK.

RADIO DIRECTION-FINDING SYSTEM.

Application filed December 6, 1920. Serial No. 428,577.

This invention relates to radio direction-finding systems, and especially to means for transmitting the signaling waves employed in such systems.

In direction-finding systems heretofore employed, such as, for example, those used to determine the positions of ships with respect to shore stations having certain fixed locations, it has been customary to use a spark set for the generation of the signaling wave used in making such determinations. From the standpoint of direction-finding, a wave generated by such means is very efficient, experience having shown that a signaling wave comprising a plurality of frequencies (such as a wave generated by a spark set) suffers less deviation from its normal course of travel as the result of transient local conditions than a wave of a single frequency. Since the accuracy of the determination of the position of a ship at sea depends upon the waves traveling in substantially straight lines from the shore stations to the ship at sea, it will be seen that any deviation of the waves from such line will introduce an error in the final determinations. Experience has shown that transient local disturbances in the region in which a location is being made oftentimes will cause a wave of a single frequency to be deviated from its true course, whereas a wave comprising a plurality of frequencies will pass through the area of the disturbance substantially unaffected thereby.

Since the use of spark sets in radio direction-finding work is undesirable for the reason that the wave generated thereby is liable to interfere with other radio channels due to the exceedingly wide range of frequencies present in a wave set up by such a set, it is the object of this invention to provide means whereby in a direction-finding system a continuous wave may be transmitted, comprising a band of frequencies, the limits of which have by predetermination been set to avoid interference with neighboring transmitting channels and the system so arranged that no frequencies other than the predetermined ones may be transmitted.

Figure 1:
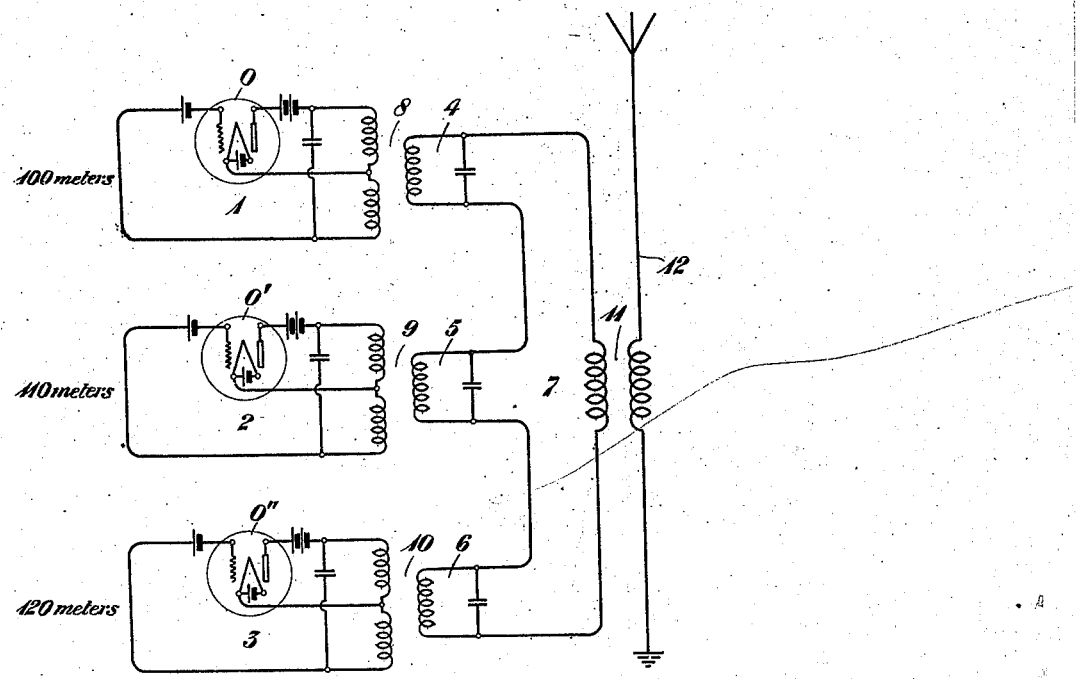
Figure 2:
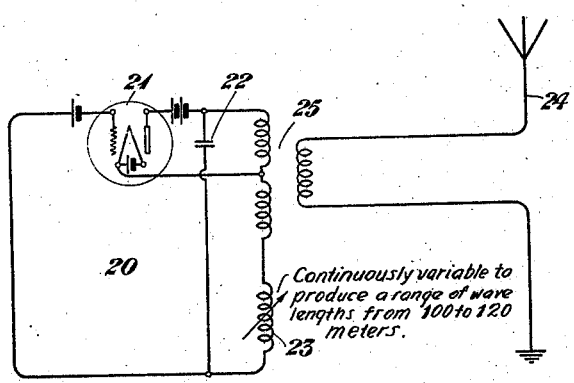
Figure 3:
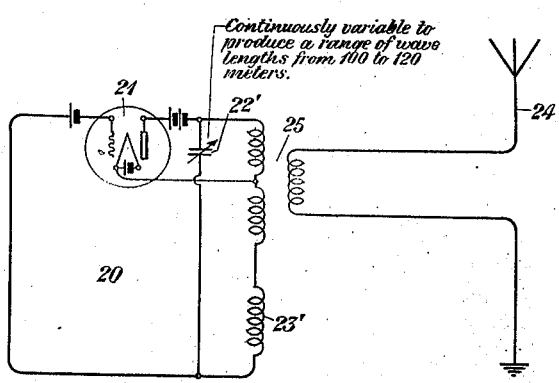
Figure 4:
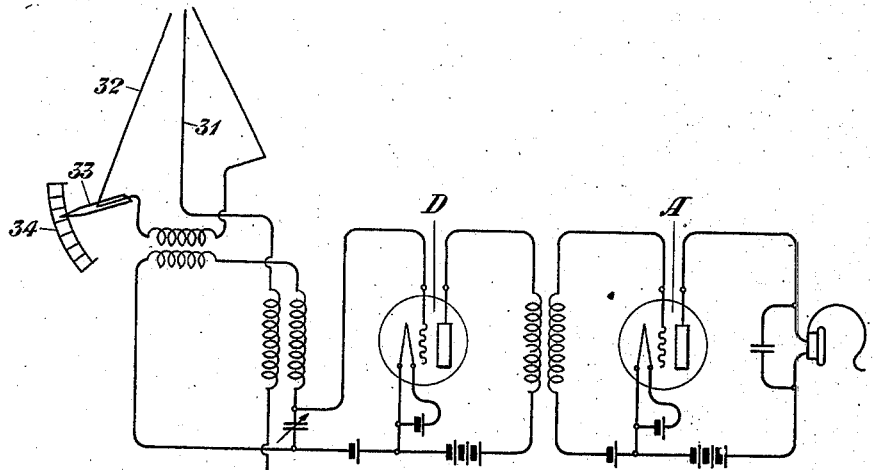

This invention will be better understood from the following description when read in connection with the attached drawing, of which Fig. 1 shows an arrangement for transmitting a wave comprising a plurality of predetermined frequencies lying between certain limits; Fig. 2 shows an arrangement for transmitting a continuous wave which varies in frequency at a uniform rate between the limits of the band that it is desired to transmit; Fig. 3 is a variation of the arrangement shown in Fig. 2 and Fig. 4 shows a receiving circuit adapted for use with the transmitting circuits shown in the preceding figures. In Fig. 1, three oscillation circuits represented by 1, 2 and 3, having associated therewith the vacuum tubes 0, 0' and 0" respectively, and coupled by means of transformers 8, 9 and 10 respectively with the tuned branches 4, 5 and 6 respectively of the common output circuit 7. The common output circuit 7 is in turn coupled by means of the transformer 11 with the antenna 12 adapted to transmit the frequencies impressed thereon. If the oscillation circuits 1, 2 and 3 are adjusted to generate, for example, waves having a length of 100, 110 and 120 meters respectively, these waves will be impressed upon the common output circuit 7 by means of the transformers 8, 9 and 10, respectively, and the tuned circuits 4, 5 and 6, respectively, and a continuous wave comprising these three frequencies will be transmitted by the antenna 12. It is to be understood that the wave lengths assumed above are merely for purposes of illustration, and that any wave length or combination of wave lengths that might be found desirable could be transmitted. It will be seen, therefore, that by means of the arrangement disclosed in this figure there may be transmitted a continuous wave representing a band of frequencies having certain predetermined limits best adapted to avoid interference of neighboring signaling channels, and designed to cover a sufficiently broad range to prevent the wave being deviated from its true course by transient local disturbances.

The arrangement shown in Fig. 2 provides for the transmission of a continuous wave varying in frequency between an upper and a lower limit. 20 represents a vacuum tube oscillating circuit having associated therewith a vacuum tube 21, a condenser 22, and a variable inductance 23. The oscillating circuit is coupled to the antenna 24 by means of a transformer 25. The inductance 23 is designed to be varied in value continuously and uniformly through a range of values which will vary the wave length of the continuous wave generated between certain limiting values, such as, for example, from 100 to 120 meters. This wave thus varied would be impressed upon the antenna 24 and transmitted thereby. Another method of varying the wave length between certain predetermined limits is shown in Fig. 3. This consists in maintaining the inductance 23' at a certain fixed value and using a variable condenser 22' in place of the fixed condenser represented by 22. Such variable condenser might be of the well-known air type having movable plates which might be continuously and uniformly rotated so as to produce a continuous wave varying in frequency between the predetermined limits.

Any well-known type of directional receiving circuits may be used in connection with the transmitting circuits shown in Figs. 1 to 3 inclusive. Such a receiving circuit is shown in the scientific paper of the Bureau of Standards No. 428, entitled "The radio direction finder and its application to navigation", page 559. Another form of directional receiving circuit is shown in Fig. 4. No claim of inventorship is made to this arrangement, which is disclosed in the copending application of Lewis M. Clement, Serial No. 412,807, filed September 25, 1920. In the arrangement shown in Fig. 4, D is a detector and A is an amplifier in the output circuit of which is connected the indicating instrument. The particular directive means shown is one of several forms embodying the well-known Bellini-Tosi principle. In the arrangement illustrated, two antennæ are mutually related to the input circuit of the detector. The antenna 31 has no directive characteristics and its presence results in continuous sound in the receiver. The antenna 32 is capable of rotation about a vertical axis as shown and has an electromotive force generated therein by the impinging radio waves, the amplitude of the electromotive force depending on the relative position of the incident waves. In general, the effect is a maximum when the plane of the antennæ is parallel to the direction of the incident waves and is a minimum or zero when its plane is normal to this direction. Accordingly, the antenna 32 is rotated until the position of maximum or minimum strength of signals is found. The system would function efficiently if the antenna 32 alone were used but the presence of static would tend to broaden the directive curve near its minimum point. Accordingly, the antenna 31 is used to provide a tone of constant intensity in the receiver, which tends to eliminate the effect of static and increases the sensitivity of adjustment of the apparatus. Further description of the principle of this arrangement need not be given here since it is well set forth on pages 633 to 635 of Fleming, "The Principles of Electric Wave Telegraphy and Telephony", 3d edition. The direction of the waves received from a transmitting station such as that shown in Fig. 1 is indicated by the position of the marker 33 upon the scale 34.

By means of the arrangements shown in these figures, or equivalent means, the objectionable feature arising from the use of spark sets in direction-finding may be eliminated and at the same time the inaccuracy arising through the use of a wave of a single frequency may be avoided.

Although this invention has been disclosed as having certain specific forms of embodiment, it is to be understood that the invention is not so limited, but is capable of embodiment in other and different forms without departing from the spirit and scope of the appended claim.

What is claimed is:

The method for determining the location of a mobile station relative to fixed stations whose separating distance is known, which consists in producing at each fixed station and transmitting therefrom a band of frequencies having definitely fixed upper and lower limits, simultaneously receiving all of the frequencies constituting the band sent from one fixed station and noting the direction of approach for maximum received current, then simultaneously receiving the frequencies constituting the band sent from the other fixed station and noting the direction of approach for maximum received current therefrom.

In testimony whereof, I have signed my name to this specification this 4th day of December, 1920.

HAROLD S. OSBORNE.